United States Patent
Bushell

(10) Patent No.: US 8,701,124 B2
(45) Date of Patent: Apr. 15, 2014

(54) NOTIFICATION BARRIER

(75) Inventor: John Samuel Bushell, San Jose, CA (US)

(73) Assignee: Apple Inc., Cupertino, CA (US)

( * ) Notice: Subject to any disclaimer, the term of this patent is extended or adjusted under 35 U.S.C. 154(b) by 83 days.

(21) Appl. No.: 13/153,198

(22) Filed: Jun. 3, 2011

(65) Prior Publication Data

US 2012/0311582 A1 Dec. 6, 2012

(51) Int. Cl.
*G06F 13/00* (2006.01)
(52) U.S. Cl.
USPC .......................................................... 719/318
(58) Field of Classification Search
USPC .......................................................... 719/318
See application file for complete search history.

(56) References Cited

U.S. PATENT DOCUMENTS

| | | | |
|---|---|---|---|
| 2003/0009602 A1* | 1/2003 | Jacobs et al. | 709/318 |
| 2006/0059287 A1* | 3/2006 | Rivard et al. | 710/300 |
| 2009/0327354 A1* | 12/2009 | Resnick et al. | 707/201 |
| 2010/0088692 A1* | 4/2010 | Rathi et al. | 717/171 |

* cited by examiner

*Primary Examiner* — Emerson Puente
*Assistant Examiner* — Steven Do
(74) *Attorney, Agent, or Firm* — Fish & Richardson P.C.

(57) ABSTRACT

The disclosed embodiments provide a system which implements a notification barrier. During operation, the system receives a call to the notification barrier installed on a sender object, wherein the call originates from a receiver object which receives notifications posted by the sender object. In response to the call, the system acquires a notification lock, wherein the notification lock is held whenever the sender is posting a notification. The system then releases the notification lock, wherein releasing the lock indicates to the receiver object that the sender object has no pending posted notifications.

24 Claims, 3 Drawing Sheets

NOTIFICATION BARRIER

BACKGROUND

1. Field

The disclosed embodiments generally relate to computer systems that support multi-threaded programming. More specifically, the disclosed embodiments relate to a method and an apparatus for implementing a notification barrier, wherein a call to the notification barrier does not return until an associated sender object has no currently pending notifications for a receiver object.

2. Related Art

Object-oriented programming environments often provide a notification system to support sending notifications between objects. For example, a sender object (associated with an audio device) can use a notification system to post a notification to a receiver object (associated with a synthesizer), wherein the notification requests that the synthesizer send more audio data to the audio device.

During construction of an object tree for an application, the notification system can be used to specify that one object sends notifications to another object. For example, a callback can be installed on a sender object to send notifications to a receiver object. (The callback could be a function pointer or closure implemented by the receiver object, or a reference to the receiver object along with an agreed object method that can be called.) Afterward, when the receiver object is no longer needed, the system tears down the receiver object, and also removes the callback from the sender object. However, when this callback is removed from the sender object, there is an inherent race condition between removing the callback and the callback firing. This can create problems because a callback may be called on another thread asynchronously from the "tear down thread" which is performing the teardown. In this case, it is possible for the other thread to begin issuing the callback just before the callback is removed by the tear down thread. As a consequence, after the tear down thread removes the callback, the system has no way of knowing whether the callback is still running on another asynchronous thread. Moreover, if the receiver object is being torn down and its memory is being reclaimed, at some point it may no longer be safe for the callback to execute.

One solution to this problem involves taking a lock while removing the callback, wherein the lock is also taken whenever the callback is called. In this way, it is not possible to remove the callback and to call the callback at the same time. However, if this solution is used, the callback cannot remove itself (which is a desirable way to express a teardown) because doing so can cause a deadlock.

Another solution is let the notification receiver deal with the problem. In this case, the notification receiver needs to leave something around that lasts indefinitely to handle a potential notification. This involves abandoning some memory to handle the fact the callback might get called later on. Because the time window for receiving a callback later on is likely to be small, it is undesirable to abandon memory indefinitely for this purpose.

There are other techniques. For example, if it is possible to control which thread the notification will be posted on, the system can arrange to do the callback removal on the same thread. However, this is a fairly strict programming constraint in a multi-threaded system, which may be impractical for many multi-threaded applications.

Hence, what is needed is an efficient technique for solving the problem of eliminating race conditions while removing a callback.

SUMMARY

The disclosed embodiments provide a system that implements a notification barrier. During operation, the system receives a call to the notification barrier installed on a sender object, wherein the call originates from a receiver object which receives notifications posted by the sender object. In response to the call, the system acquires a notification lock, wherein the notification lock is held whenever the sender is posting a notification. The system then releases the notification lock, wherein releasing the lock indicates to the receiver object that the sender object has no pending posted notifications.

In some embodiments, the system receives a request to post a notification to the receiver object. In response to this request, the system acquires the notification lock and posts the notification to the receiver object. Next, after the notification is no longer pending, the system releases the notification lock.

In some embodiments, posting the notification to the receiver object involves posting the notification to a notification center, wherein the notification center facilitates sending notifications between objects. In response to the posted notification, the notification center performs a lookup to identify listeners for the notification, wherein the identified listeners include the receiver object. Next, the notification center sends the notification to the identified listeners.

In some embodiments, posting the notification to the receiver object involves invoking a callback installed on the sender object, wherein the callback sends a notification to the receiver object.

In some embodiments, prior to invoking the callback, the system receives a request from the receiver object to install the callback on the sender object, wherein the callback is used to post notifications to the receiver object. In response to the request, the system installs the callback on the sender object.

In some embodiments, the receiver object makes the call to the notification barrier during a teardown process. More specifically, during the teardown process, the receiver object sends a request to the sender object to remove functionality that posts notifications to the receiver object. Next, the system makes the call to the notification barrier. After the call to the notification barrier returns, the system releases memory associated with receiving the notifications.

In some embodiments, the notification lock is implemented using one of the following: a mutex, a read-write lock, a dispatch queue, a test-and-set instruction, a semaphore, a monitor, or a spin lock.

In some embodiments, the receiver object is associated with a producer of media data and the sender object is associated with a consumer of media data. In this embodiment, the sender object posts notifications to the receiver object to request more media data.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

System

Figure 1:
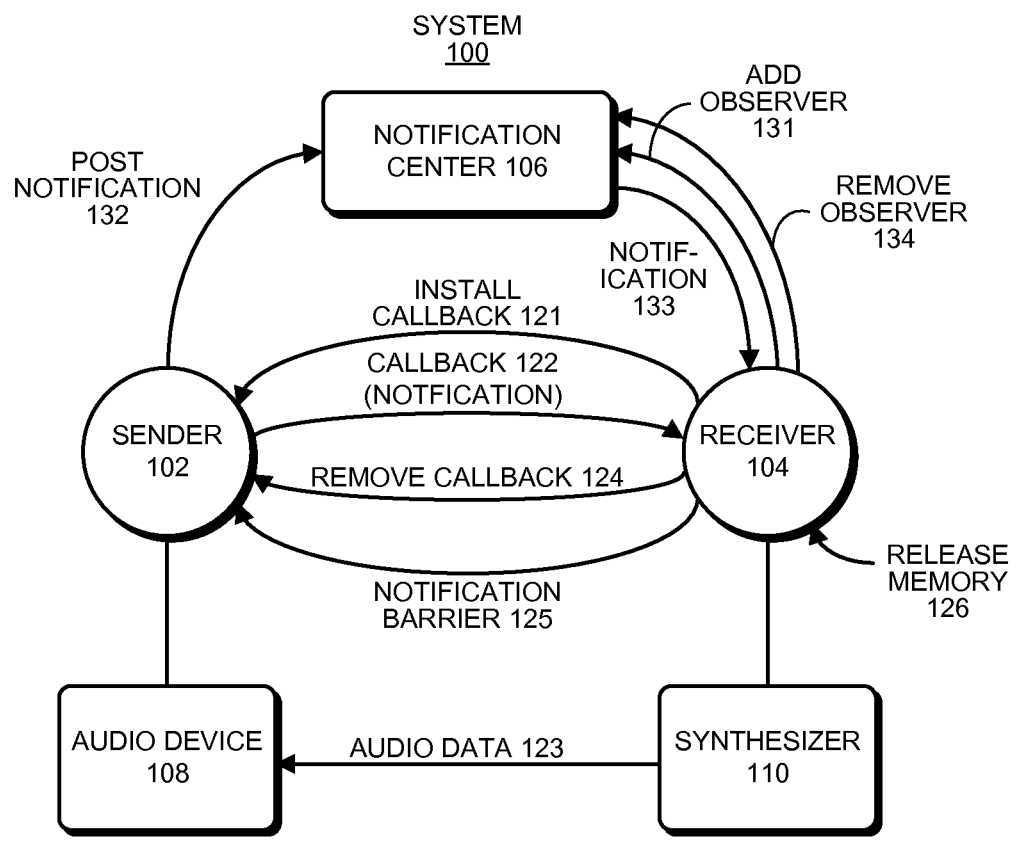
FIG. 1 illustrates a system that sends notifications between a sender object and a receiver object in accordance with the disclosed embodiments.

FIG. 1 illustrates a system 100 that sends notifications between a sender object 102 and a receiver object 104 in accordance with the disclosed embodiments. System 100 can generally include any type of computer system, including a server computer system, a desktop computer system, a laptop computer system, and a portable computing device, such as a smartphone. In some embodiments, system 100 provides an object-oriented programming environment, which facilitates developing multi-threaded, object-oriented applications. Note that system 100 facilitates sending notifications between a sender object 102 and a receiver object 104. Also note that sender object 102 and receiver object 104 exist in the same address space, which is shared between multiple threads.

In the example illustrated in FIG. 1, sender object 102 is associated with an audio device 108, which plays audio data, and receiver object 104 is associated with a synthesizer 110 that generates audio data. In this example, the sender object 102 posts notifications to a receiver object 104, wherein the notifications request that the synthesizer 110 send more audio data 123 to audio device 108.

In one embodiment, the notification functionality is implemented through a "callback" on the sender object 102. In this embodiment, receiver object 104 sends a request 121 to sender object 102 to install a callback method on sender object 102. In response to this request, sender object 102 installs the callback. This enables sender object 102 to initiate a callback 122 to provide a notification to receiver object 104. At a later time, for example when receiver object 104 is ready to tear down, receiver object 104 sends a request 124 to sender object 102 to remove the callback. This causes sender object 102 to remove the callback method. Receiver object 104 then makes a call to a notification barrier 125. After the call returns, receiver object 104 knows that calls will no longer be made through the callback. At this point it is safe for receiver object 104 to complete the teardown process and to release the memory 126 associated with receiving notifications.

In another embodiment, the notification functionality is implemented through a notification center 106. Notification center 106 provides a global service which maintains a data structure, such as a table, to keep track of which entities are listening for notifications from other entities. This enables the sender to make a call to notification center 106 saying "I'm posting a notification now," and the sender does not have to have any awareness of which entities are listening for the notification. Notification center 106 automatically calls all receivers who are currently registered. Hence, notification center 106 provides a convenient mechanism that facilitates sending notifications in a large system comprised of a number of small, flexible objects which are reusable.

To set up a notification in notification center 106, instead of installing a callback on sender object 102, receiver object 104 sends a request to notification center 106 to add an observer 131. In response to this request, notification center 106 updates its internal tables accordingly. When sender object 102 subsequently posts an associated notification 132 to notification center 106, notification center 106 sends a corresponding notification 133 to receiver object 104. At a later time, receiver object 104 can make a request to remove the observer 134 from notification center 106, which causes notification center 106 to remove a corresponding table entry. In this notification center implementation, the notification barrier bypasses the notification center 106 and works the same way as it does for the "callback" implementation.

The various operations involved in using the notification system are described in more detail below with reference to FIGS. 2-5.

Installing Notification-Posting Functionality

Figure 2:
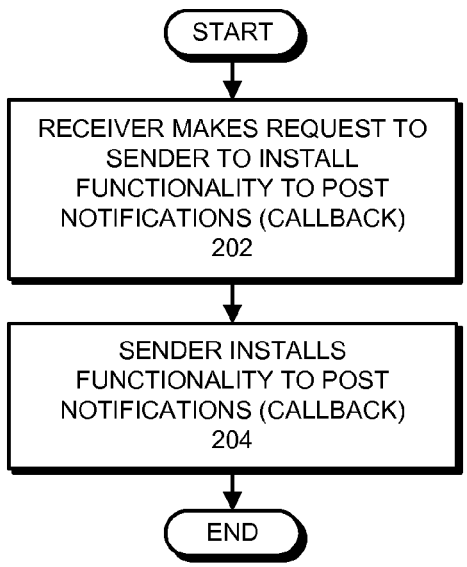
FIG. 2 presents a flow chart illustrating the process of installing functionality to post a notification in accordance with the disclosed embodiments.

FIG. 2 presents a flow chart illustrating the process of installing functionality to post a notification in accordance with the disclosed embodiments. During this process, the system receives a request from receiver object 104 to install functionality on sender object 102 to post notifications to receiver object 104 (step 202). In response to this request, the system installs the functionality on sender object 102 (step 204). As mentioned above, installing this functionality can involve installing a callback on sender object 102 or adding an observer to notification center 106.

Posting a Notification

Figure 3:
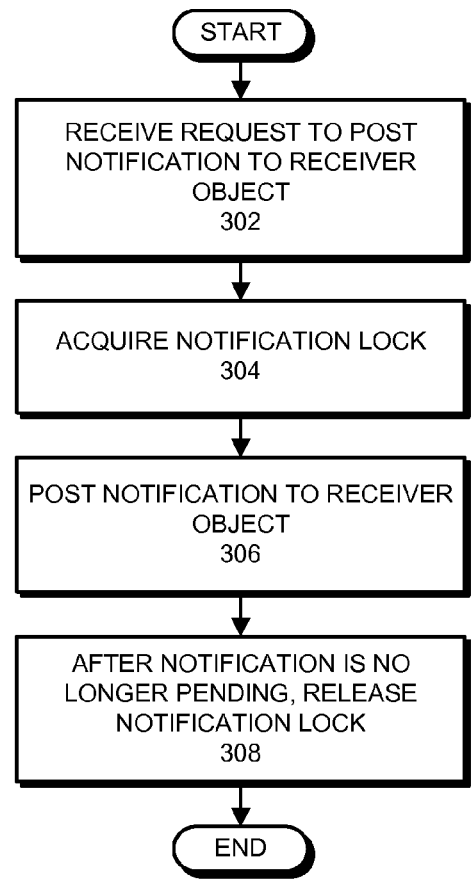
FIG. 3 presents a flow chart illustrating the process of posting a notification in accordance with the disclosed embodiments.

FIG. 3 presents a flow chart illustrating the process of posting a notification in accordance with the disclosed embodiments. During this process, the system receives a request to post a notification to the receiver object (step 302). In response to this request, the system acquires a notification lock (step 304) and posts the notification to the receiver object (step 306). Next, after the notification is no longer pending, the system releases the notification lock (step 308). As mentioned above, this notification lock can be implemented using any known multi-threaded synchronization technique, including: a mutex, a read-write lock, a dispatch queue, a test-and-set instruction, a semaphore, a monitor, or a spin lock. Note that the sender may additionally provide some type of thread protection over its list of callbacks, but this type of thread protection uses a separate mechanism, which does not involve using the notification lock or the notification barrier.

Calling a Notification Barrier

Figure 4:
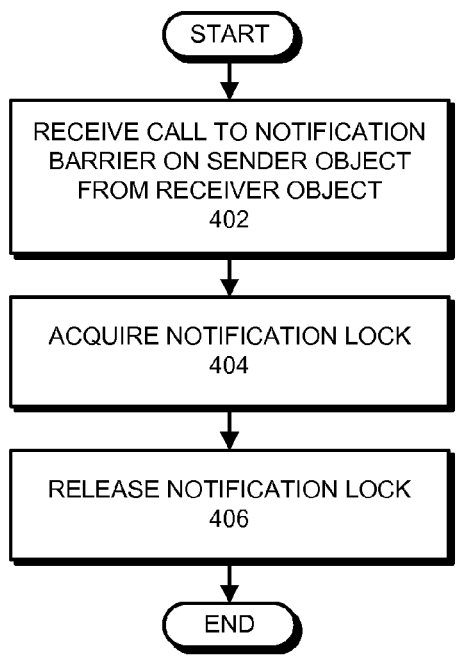
FIG. 4 presents a flow chart illustrating the process of calling a notification barrier in accordance with the disclosed embodiments.

FIG. 4 presents a flow chart illustrating the process of calling a notification barrier in accordance with the disclosed embodiments. First, the system receives a call to the notification barrier installed on a sender object, wherein the call originates from a receiver object which receives notifications posted by the sender object (step 402). In response to the call, the system acquires a notification lock (step 404), wherein the notification lock is held whenever the sender is posting a notification. Next, the system releases the notification lock (step 406), wherein releasing the lock indicates to the receiver object that the sender object has no pending posted notifications. Note that by acquiring and releasing the notification lock, the notification barrier ensures for the time that the lock is held that no associated notifications are pending.

Using a Notification Barrier

Figure 5:
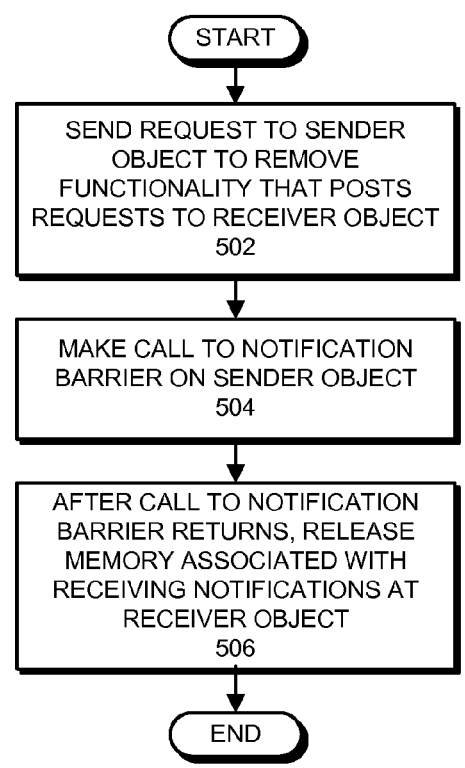
FIG. 5 presents a flow chart illustrating how a notification barrier can be used in accordance with the disclosed embodiments.

FIG. 5 presents a flow chart illustrating how a notification barrier can be used in accordance with the disclosed embodiments. (Note that the need for the notification barrier arises because the sender can outlive the receiver. This means the receiver cannot rely on tearing down the sender as a way to make the receiver's teardown safe. The sender persists.)

The notification barrier makes use of a notification lock which is held while making the callbacks (and posting notifications) and is also held and released by the notification barrier. Moreover, the notification lock is private to the sender object. This means the receiver object does not need to know about how the locking is performed. It simply calls the notification barrier on the sender object to synchronize with any stream of callbacks that the sender is potentially making to the receiver.

When the notification barrier is called, it will not return until the sender is not currently posting any notifications. This ensures that there are no asynchronous notifications directed to the receiver object and it is safe to complete the tear down process.

More specifically, during a teardown process, the receiver object can send a request to the sender object to remove the functionality that posts notifications to the receiver object (step 502). Next, after the call to remove the functionality returns, the system makes a call to the notification barrier (step 504). After the call to the notification barrier returns, the system knows there are no pending asynchronous notifications directed to the receiver object. At this point, the system can safely release the memory associated with receiving the notifications at the receiver object (step 506). Note that the above-described process makes it possible for the callback to remove itself, because no lock is taken while the callback is being removed.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for implementing a notification barrier in a multi-threaded, object-oriented processing environment of a computer system, comprising:
   installing a notification barrier on a sender software object configured to communicate with a receiver software object in the multi-threaded, object-oriented processing environment;
   when the receiver software object is to be torn down:
      sending a request to the sender software object to remove a callback method installed on the sender software object, the callback method for sending notifications to the receiver software object;
      receiving a call to the notification barrier from the receiver software object;
   responsive to the call, holding a notification lock until the sender software object has no pending notifications for the receiver software object;
   in response to releasing the notification lock, sending a return from the sender software object to the receiver software object; and
   tearing down the receiver software object in response to the return.

2. The method of claim 1, wherein the method further comprises:
   receiving a request to post a notification to the receiver software object; and
   in response to the request,
      acquiring a notification lock,
      posting the notification to the receiver software object, and
      after the notification is no longer pending, releasing the notification lock.

3. The method of claim 2,
   wherein posting the notification to the receiver software object involves posting the notification to a notification center, wherein the notification center facilitates sending notifications between software objects; and
   wherein in response to the posted notification, the notification center,
   performs a lookup to identify listeners for the notification, wherein the identified listeners include the receiver software object, and
   sends the notification to the identified listeners.

4. The method of claim 2, wherein posting the notification to the receiver software object involves invoking the callback method installed on the sender software object, wherein the callback method sends a notification to the receiver software object.

5. The method of claim 4, wherein prior to invoking the callback, the method further comprises:
   receiving a request from the receiver software object to install the callback method on the sender software object, wherein the callback method is used to post notifications to the receiver software object; and
   in response to the request, installing the callback method on the sender software object.

6. The method of claim 2, wherein the notification lock is implemented using one of the following:
   a mutex;
   a read-write lock;
   a dispatch queue;
   a test-and-set instruction;
   a semaphore;
   a monitor; and
   a spin lock.

7. The method of claim 1, wherein during the teardown process the receiver software object:
   sends a request to the sender software object to remove functionality that posts notifications to the receiver software object;
   makes the call to the notification barrier; and
   after the call to the notification barrier returns, releases memory associated with receiving the notifications.

8. The method of claim 1,
   wherein the receiver software object is associated with a producer of media data;
   wherein the sender software object is associated with a consumer of media data; and
   wherein the sender software object posts notifications to the receiver software object to request more media data.

9. A non-transitory computer-readable storage medium storing instructions that when executed by a computer system cause the computer system to perform a method for implementing a notification barrier in a multi-threaded, object-oriented processing environment of the computer system, the method comprising:
   installing a notification barrier on a sender software object configured to communicate with a receiver software object in the multi-threaded, object-oriented processing environment;
   when the receiver software object is to be torn down:
      sending a request from the receiver software object to the sender software object to remove a callback method installed on the sender software object, the callback method for sending notifications to the receiver software object;
      receiving a call to the notification barrier from the receiver software object; responsive to the call, holding a notification lock until the sender software object has no pending notifications for the receiver software object;
      in response to releasing the notification lock, sending a return from the sender software object to the receiver software object; and
      tearing down the receiver software object in response to the return.

10. The non-transitory computer-readable storage medium of claim 9, wherein the method further comprises:
    receiving a request to post a notification to the receiver software object; and
    in response to the request,
       acquiring a notification lock,
       posting the notification to the receiver software object, and
       after the notification is no longer pending, releasing the notification lock.

11. The non-transitory computer-readable storage medium of claim 10,
    wherein posting the notification to the receiver software object involves posting the notification to a notification center, wherein the notification center facilitates sending notifications between software objects; and
    wherein in response to the posted notification, the notification center,
    performs a lookup to identify listeners for the notification, wherein the identified listeners include the receiver software object, and
    sends the notification to the identified listeners.

12. The non-transitory computer-readable storage medium of claim 10, wherein posting the notification to the receiver software object involves invoking the callback installed on the sender software object, wherein the callback sends a notification to the receiver software object.

13. The non-transitory computer-readable storage medium of claim 12, wherein prior to invoking the callback, the method further comprises:
    receiving a request from the receiver software object to install the callback method on the sender software object, wherein the callback method is used to post notifications to the receiver software object; and
    in response to the request, installing the callback method on the sender software object.

14. The non-transitory computer-readable storage medium of claim 10, wherein the notification lock is implemented using one of the following:
    a mutex;
    a read-write lock;
    a dispatch queue;
    a test-and-set instruction;
    a semaphore;
    a monitor; and
    a spin lock.

15. The non-transitory computer-readable storage medium of claim 9, wherein during the teardown process the receiver software object:
    sends a request to the sender software object to remove functionality that posts notifications to the receiver software object;
    makes the call to the notification barrier; and
    after the call to the notification barrier returns, releases memory associated with receiving the notifications.

16. The non-transitory computer-readable storage medium of claim 9,
    wherein the receiver software object is associated with a producer of media data;
    wherein the sender software object is associated with a consumer of media data; and
    wherein the sender software object posts notifications to the receiver software object to request more media data.

17. An apparatus which implements a notification barrier in a multi-threaded, object-oriented processing environment of the apparatus, comprising:
    a notification barrier installed on a sender software object, wherein the notification barrier is configured to receive a call that originates from a receiver software object which receives notifications posted by the sender software object in the multi-threaded, object-oriented processing environment, where the call is received when the receiver software object is to be torn down;
    wherein in response to the call,
    a processor of the apparatus executes instructions, which causes the processor to send a request from the receiver software object to the sender software object to remove a callback method installed on the sender software object, the callback method for sending notifications to the receiver software object; holding a notification lock until the sender software object has no pending notifications for the receiver software object;
    in response to release of the notification lock, send a return from the sender software object to the receiver software object; and
    tear down the receiver software object in response to the return.

18. The apparatus of claim 17, wherein the apparatus further comprises:
    a notification-posting mechanism configured to receive a request to post a notification to the receiver software object; and wherein in response to the request, the notification-posting mechanism is configured to,
acquire a notification lock,
post the notification to the receiver software object, and
after the notification is no longer pending, release the notification lock.

19. The apparatus of claim 18,
wherein the notification-posting mechanism is configured to post the notification to a notification center, wherein the notification center facilitates sending notifications between software objects; and
wherein in response to the posted notification, the notification center,
performs a lookup to identify listeners for the notification, wherein the identified listeners include the receiver software object, and
sends the notification to the identified listeners.

20. The apparatus of claim 18, wherein the notification-posting mechanism comprises the callback method installed on the sender software object, wherein while posting the notification, the callback method is configured to send a notification to the receiver software object.

21. The apparatus of claim 20, further comprising an installation mechanism, wherein in response to receiving a request from the receiver software object to install the callback method on the sender software object, the installation mechanism is configured to install the callback method on the sender software object.

22. The apparatus of claim 18, wherein the notification lock is implemented using one of the following:
a mutex;
a read-write lock;
a dispatch queue;
a test-and-set instruction;
a semaphore;
a monitor; and
a spin lock.

23. The apparatus of claim 17, wherein during the tear-down process the receiver software object is configured to:
send a request to the sender software object to remove functionality that posts notifications to the receiver software object;
make the call to the notification barrier, and
after the call to the notification barrier returns, release memory associated with receiving the notifications.

24. The apparatus of claim 17,
wherein the receiver software object is associated with a producer of media data;
wherein the sender software object is associated with a consumer of media data; and
wherein the sender software object posts notifications to the receiver software object to request more media data.

* * * * *